(12) United States Patent
Imai et al.

(10) Patent No.: US 11,089,195 B2
(45) Date of Patent: Aug. 10, 2021

(54) CAMERA MODULE SHIELDING MECHANISM AND ELECTRONIC DEVICE

(71) Applicant: Nidec Copal Corporation, Tokyo (JP)

(72) Inventors: Kenzo Imai, Tokyo (JP); Koji Sawanobori, Tokyo (JP); Nobuaki Watanabe, Tokyo (JP); Daisuke Yaginuma, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/803,916

(22) Filed: Feb. 27, 2020

(65) Prior Publication Data

US 2020/0280663 A1    Sep. 3, 2020

(30) Foreign Application Priority Data

Feb. 28, 2019   (JP) .............................. JP2019-035830

(51) Int. Cl.
*H04N 5/225*    (2006.01)
*H04N 5/232*    (2006.01)
*G03B 19/18*    (2021.01)

(52) U.S. Cl.
CPC ......... *H04N 5/2257* (2013.01); *H04N 5/2252* (2013.01); *H04N 5/2254* (2013.01); *H04N 5/23232* (2013.01); *G03B 19/18* (2013.01)

(58) Field of Classification Search
CPC .............. H04N 5/2257; H04N 5/2252; H04N 5/23232; H04N 5/2254; G03B 19/18; G03B 7/00
See application file for complete search history.

(56) References Cited

U.S. PATENT DOCUMENTS

| | | | | |
|---|---|---|---|---|
| 4,174,157 A  * | 11/1979 | Gottschalk | ............. | G03B 19/18 352/35 |
| 7,435,018 B2 * | 10/2008 | Huang | ................... | G03B 17/04 348/373 |
| 8,430,594 B2 * | 4/2013 | Liu | ...................... | H04N 5/2252 403/321 |
| 10,698,454 B2 * | 6/2020 | Zeng | ..................... | G03B 17/04 |

(Continued)

FOREIGN PATENT DOCUMENTS

CN          107197133 A      9/2017
WO       2015/041066 A1      3/2015

*Primary Examiner* — Hung H Lam
(74) *Attorney, Agent, or Firm* — Hauptman Ham, LLP

(57) ABSTRACT

A technique enhances security measures in the IoT by reducing leakage of private images and degraded security due to unauthorized image capturing, eliminates the possibility that an unintended image is captured and stored, and also shows people around the user that the camera function of an electronic device is not working. A camera module shielding mechanism for shielding a camera module by retracting the camera module into a housing of an electronic device includes a support member supporting the camera module, a slide support supporting the support member in a slidable manner, an urging member that urges the support member in a direction in which the camera module protrudes from the housing, a locking member that locks the support member with the camera module retracted in the housing, and an actuator that unlocks the locking member.

3 Claims, 4 Drawing Sheets

(56) References Cited

U.S. PATENT DOCUMENTS

| | | | |
|---|---|---|---|
| 2008/0031606 A1* | 2/2008 | Zax | H04N 7/142 |
| | | | 396/56 |
| 2016/0198070 A1 | 7/2016 | Nakano et al. | |
| 2016/0309092 A1* | 10/2016 | Feinberg | H04N 5/2252 |
| 2017/0064166 A1* | 3/2017 | Xiong | H04N 5/2254 |
| 2019/0373141 A1* | 12/2019 | Xu | H04N 5/2251 |

* cited by examiner

CAMERA MODULE SHIELDING MECHANISM AND ELECTRONIC DEVICE

RELATED APPLICATIONS

The present application claims priority to Japanese Application Number 2019-035830, filed Feb. 28, 2019, the disclosure of which is hereby incorporated by reference herein in its entirety.

BACKGROUND

Technical Field

The present invention relates to a camera module shielding mechanism and an electronic device including the camera module shielding mechanism.

Description of the Background

Many electronic devices nowadays are capable of processing, storing, and transmitting obtained images, and commonly incorporate a camera module for capturing images. The camera module in such an electronic device typically includes a lens and an image sensor and is accommodated in the housing of the electronic device. The lens is exposed through an opening in the housing of the electronic device (refer to Patent Literature 1 below).

CITATION LIST

Patent Literature

Patent Literature 1: International Publication No. WO2015/041066

BRIEF SUMMARY

Many electronic devices nowadays are used while connected to a network, as expressed in the Internet of Things (IoT). IoT electronic devices may be constantly susceptible to cracking (malicious hacking) and cyberattacks, against which security measures are to be taken.

In an electronic device incorporating a camera module, the lens aperture for taking light in the camera module is constantly uncovered as described above. In the IoT, the camera function may thus be activated by a malicious remote operation, possibly causing leakage of private images or degraded security due to unauthorized image capturing.

For a mobile electronic device, even while the device is disconnected from the Internet, the camera module may capture and store an unintended image through its constantly uncovered lens aperture. In such a case, the user may be suspected of secretly taking a picture. Although an image is not actually captured, the user of the camera module with such an uncovered lens aperture may be wrongly suspected of secretly taking a picture by people around the user.

In response to the above issue, one or more aspects of the present invention are directed to a technique for enhancing security measures in the IoT by reducing leakage of private images and degraded security due to unauthorized image capturing in an electronic device including a camera module, eliminating the possibility that an unintended image is captured and stored, and also showing people around the user that the camera function of the electronic device is not working.

The mechanism according to one or more aspects of the present invention has the structure described below.

A camera module shielding mechanism for shielding a camera module by retracting the camera module into a housing of an electronic device includes a support member supporting the camera module, a slide support supporting the support member in a slidable manner, an urging member that urges the support member in a direction in which the camera module protrudes from the housing, a locking member that locks the support member with the camera module retracted in the housing, and an actuator that unlocks the locking member.

DETAILED DESCRIPTION

Figure 1:
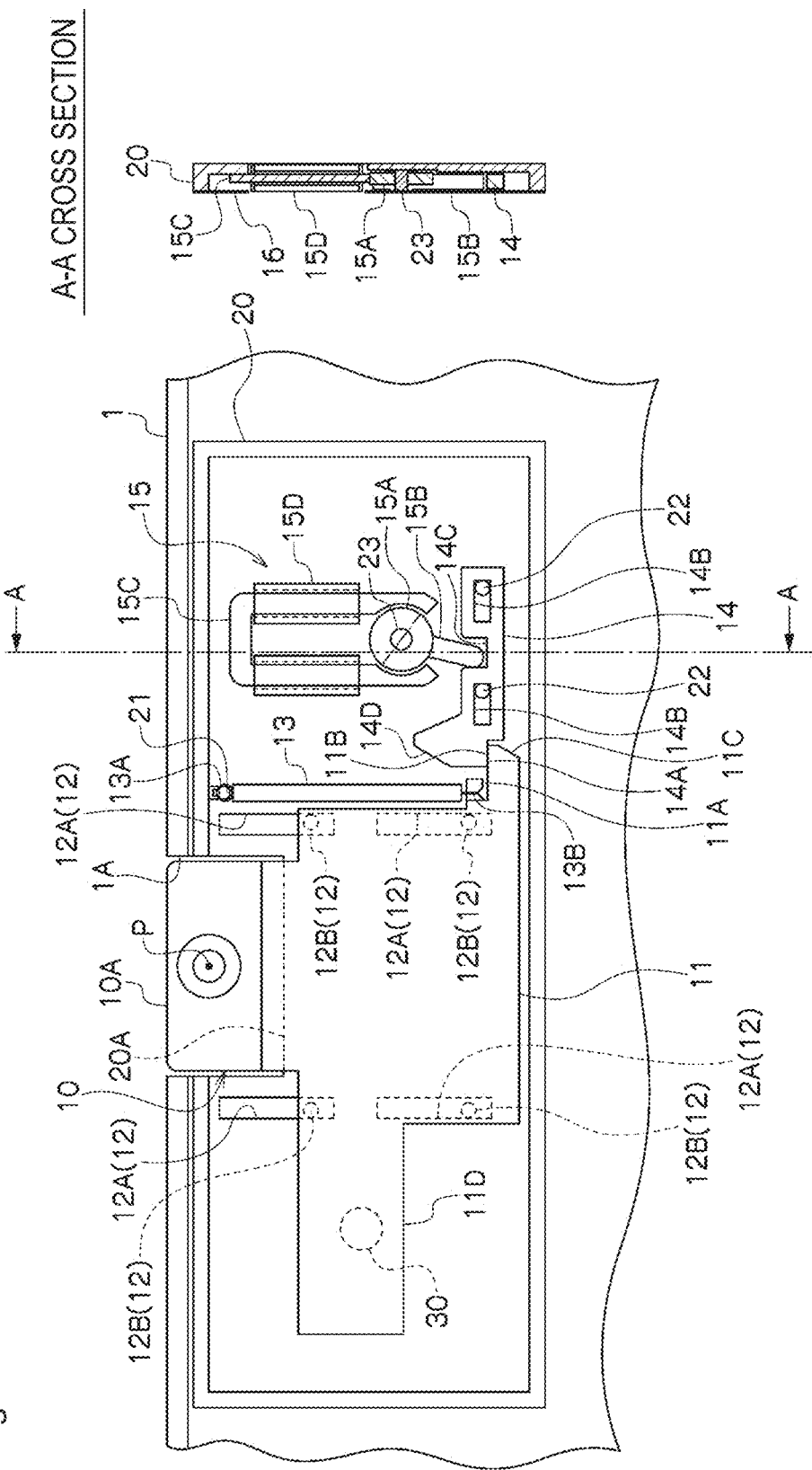
FIG. 1A is a plan view of a camera module shielding mechanism according to an embodiment of the present invention.
FIG. 1B is a cross-sectional view taken along line A-A in FIG. 1A.

Embodiments of the present invention will now be described with reference to the drawings. Hereafter, the components with the same function in different figures are given the same reference numerals, and will not be described repeatedly.

In FIGS. 1A and 1B, a camera module 10 is shielded when retracted into an electronic device housing 1. A shielding mechanism for the camera module 10 includes a support member 11 supporting the camera module 10, a slide support 12 supporting the support member 11 in a slidable manner, an urging member 13 that urges the support member 11 in one direction, a locking member 14 that locks the support member 11, an actuator 15 that unlocks the locking member 14, and a cover 16 that flatly covers the shielding mechanism.

The electronic device housing 1 has a port 1A through which the camera module 10 is retracted inside. The port 1A communicates with an internal space that receives the camera module 10. In the illustrated example, the camera module 10 is retracted in the housing 1 with its top surface 10A flush with the opening edge of the port 1A in the housing 1.

The support member 11 for supporting the camera module 10 is a flat plate and supported in a slidable manner by the slide support 12 on a base member 20, which is also a flat plate. The slide support 12 has grooves 12A extending in the direction in which the support member 11 slides, and protrusions 12B engaged with the grooves 12A. The protrusions 12B are attached to the support member 11. When the protrusions 12B move along the grooves 12A, the support member 11 slides along the length of the grooves 12A. In other embodiments, at least one of the grooves 12A may be formed on the support member 11, and at least one of the protrusions 12B may be located on the base member 20.

The urging member 13, which is formed from an elastic member such as a spring or rubber, urges the support member 11 in the direction in which the camera module 10 protrudes from the housing 1. When the support member 11 becomes unlocked by the locking member 14 within the housing 1, the urging force (elastic force) of the urging member 13 causes the camera module 10 to protrude through the port 1A. The urging direction of the urging member 13 is parallel or identical to the direction along the length of the grooves 12A on the slide support 12. The urging member 13 has one end 13A fixed to a protrusion 21 on the base member 20, and another end 13B fixed to a projection 11A on the support member 11.

The locking member 14 locks the support member 11 with the camera module 10 retracted in the housing 1. The support member 11 has a locking projection 11B projecting in a direction crossing the direction in which the support member 11 slides. The locking member 14 has a contact portion 14A at its one end and locks the support member 11 with the contact portion 14A in contact with the locking projection 11B.

The locking member 14 is supported by the base member 20 in a manner movable along the length of the locking projection 11B. The locking member 14 has a pair of slots 14B arranged straight along the length of the locking projection 11B. The slots 14B each receive a corresponding projection 22 on the base member 20.

The actuator 15 is supported by the base member 20 and includes a rotatable magnet 15A supported about a shaft 23 on the base member 20 in a rotatable manner, an actuation portion 15B with its basal end fixed on the rotatable magnet 15A, a U-shaped yoke 15C with its ends arranged on both sides of the rotatable magnet 15A, and coils 15D wound around the yoke 15C. The actuation portion 15B of the actuator 15 is engaged in a recess 14C in the locking member 14 without overlapping each other in a plan view. When the rotatable magnet 15A rotates and the actuation portion 15B swings, the locking member 14 moves in the direction along the length of the locking projection 11B on the support member 11 (away from the support member 11).

The cover 16 flatly covers the shielding mechanism except a receiving portion 20A, preventing foreign matter such as dust in the electronic device from entering the shielding mechanism. When the housing 1 deforms under pressure applied to the electronic device, the cover 16 may prevent the deformed housing 1 from coming in contact with the camera module 10.

The base member 20 supports the actuator 15 within the housing 1 and holds the support member 11 supported on the slide support 12 in a slidable manner. The base member 20 also has, as a space that receives the camera module 10 retracted into the housing 1, the receiving portion 20A that is a recess formed in the direction in which the support member 11 slides. The receiving portion 20A receives the camera module 10 having the thickness in the optical axis direction to be within the thickness of the receiving portion 20A. This prevents the camera module 10 from overlapping, in the thickness direction along the optical axis, with the base member 20 in the thickness direction, thus achieving the thin shielding mechanism.

The base member 20 may also support a microphone 30 as appropriate. The microphone 30 can pick up sound while the camera module 10 captures an image. The support member 11 also includes a sound insulator 11D covering the sound pickup portion of the microphone 30 while the camera module 10 is retracted. The sound insulator 11D reduces unauthorized leakage of private sounds and other sounds by retracting the camera module 10 into the housing 1.

Figure 2:
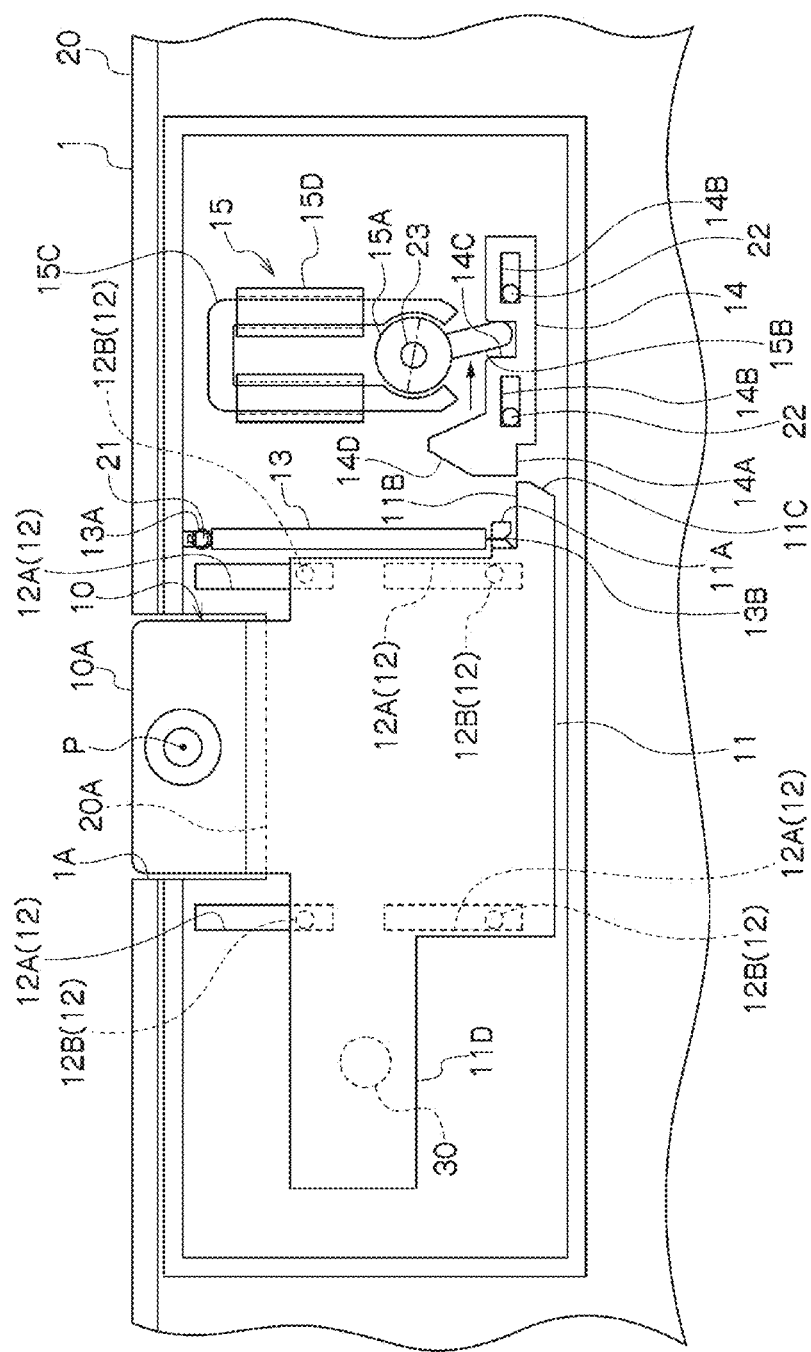
FIG. 2 is a plan view of the camera module shielding mechanism (unlocked) according to the embodiment of the present invention.

The operation of the shielding mechanism for the camera module 10 will now be described. When the coils 15D in the actuator 15 are energized with the camera module 10 retracted in the housing 1 as shown in FIGS. 1A and 1B, the actuation portion 15B of the actuator 15 swings in the arrow direction as shown in FIG. 2. The locking member 14 moves away from the support member 11, and the contact portion 14A of the locking member 14 is separated from the locking projection 11B on the support member 11.

Figure 3:
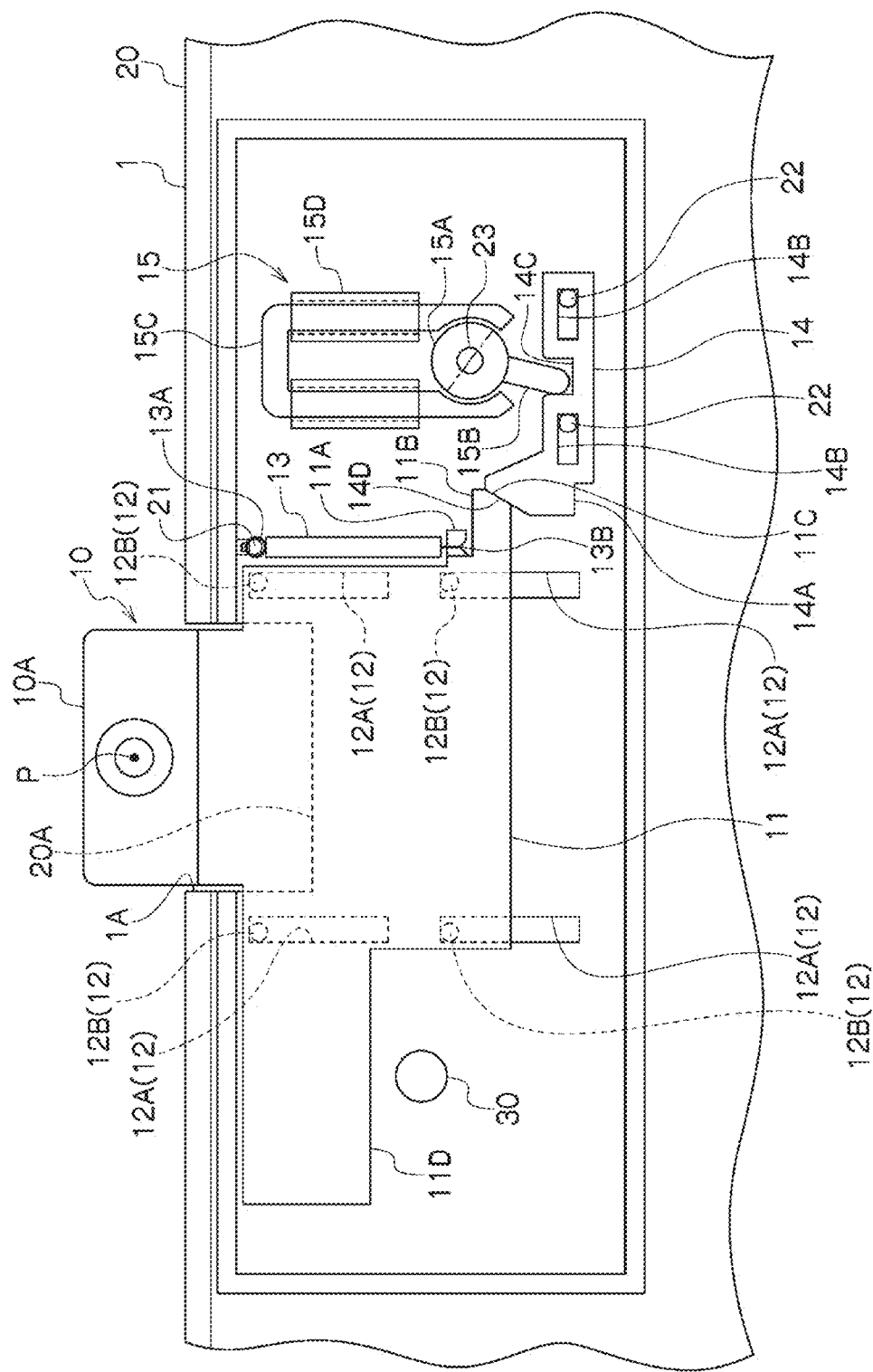
FIG. 3 is a plan view of the camera module shielding mechanism (with the camera module protruding) according to the embodiment of the present invention.

The urging force from the urging member 13 then slides the support member 11 along the length of the grooves 12A on the slide support 12, and as shown in FIG. 3, the camera module 10 supported by the support member 11 protrudes from the housing 1 through the port 1A. The support member 11 slides linearly in a manner to maintain the orientation of the lens optical axis P of the camera module 10. The protrusions 12B in contact with the ends of the grooves 12A prevent the camera module 10 from excessively protruding from the housing 1. In other words, the ends of the grooves 12A serve as stoppers of the slide support 12. In other embodiments, the slide support 12 may have a stopper other than the ends of the grooves 12A.

When the coils 15D in the actuator 15 are de-energized, the actuation portion 15B of the actuator 15 returns to its initial state under the magnetic force from the rotatable magnet 15A, as shown in FIG. 3. The locking member 14 moves toward the support member 11, and a cam surface 14D on the locking member 14 comes into contact with a cam surface 11C on the locking projection 11B on the support member 11 to hold the support member 11 with the camera module 10 protruding from the housing 1.

To retract the camera module 10 into the housing 1, the top surface 10A of the camera module 10 is depressed by hand to slide the support member 11 along the grooves 12A. In this state, the support member 11 is urged by the urging member 13 in the direction in which the camera module 10 protrudes. Additionally, with the cam surface 14D of the locking member 14 in contact with the cam surface 11C of the locking projection 11B on the support member 11, the support member 11 is also held under the magnetic force from the rotatable magnet 15A. Thus, to retract the camera module 10 into the housing 1, the top surface 10A of the camera module 10 is to be depressed under the force against the urging force from the urging member 13 and against the attractive magnetic force from the rotatable magnet 15A.

When the top surface 10A of the camera module 10 is depressed, the cam surface 11C of the support member 11 pushes the cam surface 14D of the locking member 14 to displace the locking member 14. With the top surface 10A of the camera module 10 fully retracted in the housing 1, as shown in FIGS. 1A and 1B, the contact portion 14A of the locking member 14 is locked with the locking projection 11B on the support member 11, and the support member 11 is held with the camera module 10 retracted in the housing 1. In other embodiments, the locking member 14 may be properly returned to its initial state (in FIGS. 1A and 1B) under the urging force from a spring or under the magnetic force from a magnet.

When the camera module 10 is retracted into the housing 1, the shielding mechanism for the camera module 10 with this structure shields the lens optical axis P of the camera module 10, and the camera module 10 is invisible from outside. Thus, even for an electronic device used while connected to a network, retracting the camera module 10 into the housing 1 reduces leakage of private images and unauthorized image capturing. When a user carries an electronic device, retracting the camera module 10 into the housing 1 prevents an unintended image from being captured and stored, and also prevents the user from being wrongly suspected of secretly taking a picture by people around the user.

The shielding mechanism for the camera module 10 with this structure allows the flat support member 11 to slide along the surface of the flat base member 20, and thus has an overall thin structure. The thin structure allows the shielding mechanism and the camera module 10 to have substantially the same thickness. This allows an electronic device with a space limited in the thickness direction to incorporate the shielding mechanism for the camera module 10 without reducing the space for other components in the electronic device.

The actuator 15 of the shielding mechanism for the camera module 10 slightly moves the locking member 14 to unlock the locking member 14 and release the support member 11. The actuator 15 is thus operated using merely a small amount of electric power. This operation of the actuator 15 minimizes the power consumption of the shielding mechanism for the camera module 10. For an electronic device having a space enough to receive the camera module 10 in the thickness direction, providing a flat space allows installation of the shielding mechanism within the electronic device.

Figure 4A:
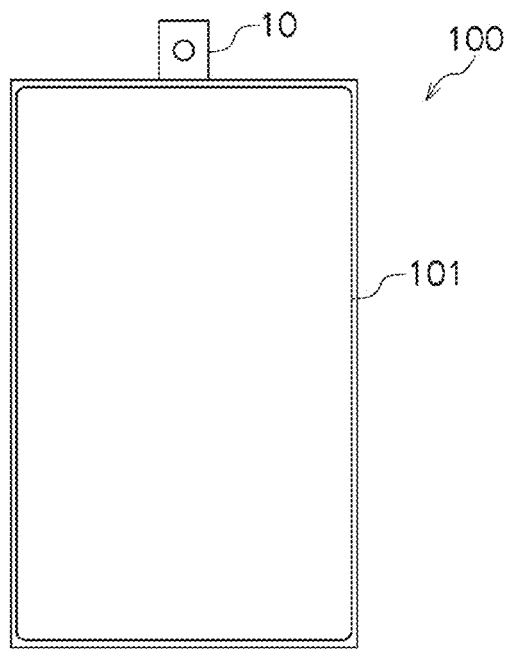
FIG. 4A is an external view of an electronic device incorporating the camera module shielding mechanism with the camera module protruding.
Figure 4B:
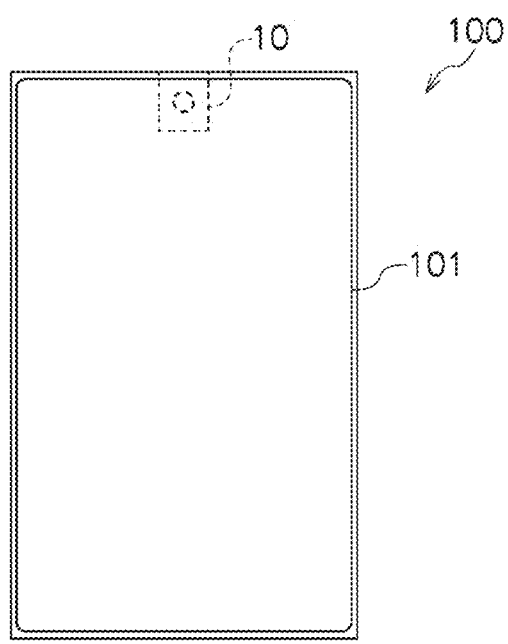
FIG. 4B is an external view with the camera module retracted (shielded).

FIGS. 4A and 4B show an electronic device including the above shielding mechanism for the camera module 10. The illustrated electronic device is a mobile electronic device 100 with its housing 1 having a display 101 on the front surface. This camera module 10 protrudes from the housing 1 when in use, and retracts into the housing 1 when not in use. The housing 1 may thus eliminate a space for the lens aperture in the camera module 10. As illustrated, the screen of the display 101 may thus almost entirely occupy one surface of the housing 1, increasing the display area of the display 101 up to the front surface of the housing 1. The shielding mechanism is thin, thus allowing the shielding mechanism and the display 101 to overlay each other within the housing 1 without increasing the thickness of the electronic device 100.

The electronic device 100 including the shielding mechanism for the camera module 10 reduces leakage of private images and unauthorized image capturing to enhance security measures in the IoT and eliminate the possibility that an unintended image is captured and stored. Additionally, the camera module 10 is retracted in the housing 1, showing people around the user that the camera function of the electronic device 100 is not working. This prevents the user using the electronic device 100 as a mobile device from being wrongly suspected of secretly taking a picture.

The electronic device 100 may be a laptop personal computer (PC), in addition to a smartphone or a tablet. For a laptop PC, the shielding mechanism is incorporated in the housing that includes the display. If the electronic device 100 is hacked and the camera module 10 protrudes from the housing 1 as unintended by the user, the user can notice the protruding camera module 10 not in use. The user can place the camera module 10 back into the housing 1, or into a state in which the camera module 10 cannot take a picture. In other embodiments, the user may directly move and unlock the locking member 14 to cause the camera module 10 to protrude.

Although the embodiments of the present invention have been described in detail with reference to the drawings, the specific structures are not limited to the above embodiments. The present invention may be modified in design without departing from the spirit and scope of the present invention. Additionally, the techniques described in the above embodiments may be combined, unless any contradiction arises in their purposes and structures.

What is claimed is:

1. A camera module shielding mechanism for shielding a camera module by retracting the camera module into a housing of an electronic device, the mechanism comprising:
   a support member supporting the camera module;
   a slide support supporting the support member in a slidable manner;
   an urging member configured to urge the support member in a direction in which the camera module protrudes from the housing;
   a locking member configured to lock the support member with the camera module retracted in the housing; and
   an actuator configured to unlock the locking member, wherein
   the slide support is located on a base member supporting the actuator, the base member has a receiving portion in which the camera module is retractable, and the base member supports a microphone, and
   the support member is slidable along a flat surface of the base member, and the support member includes a sound insulator to cover a sound pickup portion of the microphone when the camera module is retracted.

2. The camera module shielding mechanism according to claim 1, wherein
   the support member is slidable in a manner to maintain an orientation of a lens optical axis of the camera module.

3. An electronic device, comprising:
   a housing;
   a camera module; and
   a shielding mechanism configured to shield the camera module by retracting the camera module into the housing,
   wherein the shielding mechanism includes
   a support member supporting the camera module,
   a slide support supporting the support member in a slidable manner,
   an urging member configured to urge the support member in a direction in which the camera module protrudes from the housing,
   a locking member configured to lock the support member with the camera module retracted in the housing, and
   an actuator configured to unlock the locking member, wherein
   the slide support is located on a base member supporting the actuator, the base member has a receiving portion in which the camera module is retractable, and the base member supports a microphone, and
   the support member is slidable along a flat surface of the base member, and the support member includes a sound insulator to cover a sound pickup portion of the microphone when the camera module is retracted.

* * * * *